US012613101B2

(12) United States Patent (10) Patent No.: US 12,613,101 B2
Hasegawa et al. (45) Date of Patent: Apr. 28, 2026

(54) ERRONEOUS ROUTE CONVERSION DETERMINATION APPARATUS AND ERRONEOUS ROUTE CONVERSION DETERMINATION METHOD FOR ERRONEOUS ROUTE CONVERSION DETERMINATION APPARATUS

(71) Applicant: TOYOTA JIDOSHA KABUSHIKI KAISHA, Toyota (JP)

(72) Inventors: Jun Hasegawa, Kawaguchi (JP); Hideharu Sato, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 18/669,812

(22) Filed: May 21, 2024

(65) Prior Publication Data

US 2024/0393117 A1 Nov. 28, 2024

(30) Foreign Application Priority Data

May 23, 2023 (JP) ................................. 2023-084564

(51) Int. Cl.
*G01C 21/34* (2006.01)
(52) U.S. Cl.
CPC ..... *G01C 21/3415* (2013.01); *G01C 21/3461* (2013.01)
(58) Field of Classification Search
CPC ............ G01C 21/3415; G01C 21/3461; G01C 21/3407; G01C 21/30
See application file for complete search history.

(56) References Cited

U.S. PATENT DOCUMENTS

| | | | | |
|---|---|---|---|---|
| 2013/0261856 A1* | 10/2013 | Sharma | ................ | B61L 25/026 |
| | | | | 701/19 |
| 2018/0058860 A1* | 3/2018 | Matsumoto | .......... | G08G 1/0129 |
| 2018/0182238 A1* | 6/2018 | Fowe | ................... | G08G 1/0112 |
| 2018/0188743 A1* | 7/2018 | Wheeler | ................ | G01C 21/30 |

(Continued)

FOREIGN PATENT DOCUMENTS

| | | | |
|---|---|---|---|
| JP | 2017215653 A | * | 12/2017 |
| JP | 2019-184498 A | | 10/2019 |

OTHER PUBLICATIONS

Machine translation for JP2017215653A, NIshida Kentaro , Dec. 7, 2017.*

*Primary Examiner* — Abdalla A Khaled
(74) *Attorney, Agent, or Firm* — Sughrue Mion, PLLC

(57) ABSTRACT

Provided is an erroneous route conversion determination apparatus that determines presence or absence of erroneous route conversion when a set route on a navigation map for a navigation system of a vehicle is converted into a practical route on a high-precision map, in which position information of intersections on the set route and heading angles at the intersections of the set route are extracted based on the navigation map and the set route, position information of intersections on the practical route and heading angles at the intersections on the practical route are extracted based on the high-precision map and the practical route, and the presence or absence of the erroneous route conversion is determined based on a heading angle of the set route and a heading angle of the practical route at a common intersection that is an intersection common between the set route and the practical route.

9 Claims, 9 Drawing Sheets

(56) References Cited

U.S. PATENT DOCUMENTS

| | | | |
|---|---|---|---|
| 2019/0145786 A1* | 5/2019 | Yamaguchi | G01C 21/3484 |
| | | | 701/411 |
| 2019/0204096 A1* | 7/2019 | Cai | G01C 21/3446 |
| 2020/0282980 A1* | 9/2020 | Kinoshita | G05D 1/0027 |
| 2021/0080269 A1* | 3/2021 | Sharma | G06Q 10/047 |
| 2022/0155081 A1* | 5/2022 | Ahn | B60W 60/0011 |
| 2025/0207922 A1* | 6/2025 | Yan | G01C 21/3415 |

* cited by examiner

SET ROUTE

PRACTICAL ROUTE
(ERRONEOUS ROUTE
CONVERSION IS PRESENT)

ERRONEOUS ROUTE CONVERSION DETERMINATION APPARATUS AND ERRONEOUS ROUTE CONVERSION DETERMINATION METHOD FOR ERRONEOUS ROUTE CONVERSION DETERMINATION APPARATUS

CROSS-REFERENCE TO RELATED APPLICATIONS

This application is based upon and claims the benefit of priority from Japanese Patent Application No. 2023-084564, filed on May 23, 2023, the entire contents of which are incorporated herein by reference.

TECHNICAL FIELD

The present disclosure relates to an erroneous route conversion determination apparatus and an erroneous route conversion determination method for an erroneous route conversion determination apparatus.

BACKGROUND

In the related art, as a technical literature regarding an erroneous route conversion determination apparatus, Japanese Unexamined Patent Application Publication No. 2017-215653 is known. This publication describes an autonomous driving system that acquires junction information in an autonomous driving section searched for by a navigation apparatus outside a vehicle. In this system, determination about whether or not to permit autonomous driving is made based on whether or not the found junction matches detailed map data stored in the vehicle.

SUMMARY

It is known that erroneous route conversion may occur in converting a route on a navigation map for a navigation system into a route on a high-precision map for use in autonomous driving, driving assistance, or the like. Execution of autonomous driving or driving assistance in a state in which erroneous route conversion has occurred causes problems. For this reason, there is a demand for a technique that appropriately determines the presence or absence of erroneous conversion.

An aspect of the present disclosure is an erroneous route conversion determination apparatus that determines presence or absence of erroneous route conversion when a set route on a navigation map for a navigation system of a vehicle is converted into a practical route on a high-precision map. The erroneous route conversion determination apparatus extracts position information of intersections on the set route and heading angles at the intersections of the set route based on the navigation map and the set route. The erroneous route conversion determination apparatus extracts position information of intersections on the practical route and heading angles at the intersections on the practical route based on the high-precision map and the practical route. The erroneous route conversion determination apparatus determines the presence or absence of the erroneous route conversion based on a heading angle of the set route and a heading angle of the practical route at a common intersection that is an intersection common between the set route and the practical route.

With the erroneous route conversion determination apparatus according to the aspect of the present disclosure, the presence or absence of erroneous route conversion is determined from the heading angles of the set route and the practical route at the common intersection while focusing on the intersection where erroneous route conversion is likely to occur, so that the presence or absence of the erroneous route conversion in the conversion of the set route on the navigation map into the practical route on the high-precision map can be appropriately determined.

In the above-described erroneous route conversion determination apparatus, determination may be made whether or not the vehicle traveling along the set route will go straight ahead at the common intersection, based on the heading angle of the set route at the common intersection, and determination may be made whether or not the vehicle traveling along the practical route will go straight ahead at the common intersection, based on the heading angle of the practical route at the common intersection. In the erroneous route conversion determination apparatus, when a determination result of a heading direction at the common intersection of the set route and a determination result of a heading direction at the common intersection of the practical route do not match each other, determination may be made that the erroneous route conversion occurs.

In the above-described erroneous route conversion determination apparatus, when a road link having an angle with respect to an entry link of the set route closest to 180° among a plurality of road links extending from the common intersection is not an exit link of the set route, determination may be made that the vehicle traveling along the set route will not go straight ahead at the common intersection. In the erroneous route conversion determination apparatus, when a road link having an angle with respect to an entry link of the practical route closest to 180° among the plurality of road links extending from the common intersection is not an exit link of the practical route, determination may be made that the vehicle traveling along the practical route will not go straight ahead at the common intersection.

In the above-described erroneous route conversion determination apparatus, road types of roads on the set route may be extracted based on the navigation map and the set route, road types of roads on the practical route may be extracted based on the high-precision map and the practical route, and the presence or absence of the erroneous route conversion may be determined based on the road types of the roads on the set route and the road types of the roads on the practical route.

In the above-described erroneous route conversion determination apparatus, determination may be made whether or not the vehicle traveling along the set route will go straight ahead at the common intersection, based on road types of the set route before and after the common intersection, and determination is made whether or not the vehicle traveling along the practical route will go straight ahead at the common intersection, based on road types of the practical route before and after the common intersection. In the erroneous route conversion determination apparatus, when a determination result of a heading direction at the common intersection of the set route and a determination result of a heading direction at the common intersection of the practical route do not match each other, determination may be made that the erroneous route conversion occurs.

In the above-described erroneous route conversion determination apparatus, when a road type of an entry link of the set route and a road type of an exit link of the set route at the common intersection do not match each other, determination may be made that the vehicle traveling along the set route will not go straight ahead at the common intersection. In the erroneous route conversion determination apparatus, when a road type of an entry link of the practical route and a road type of an exit link of the practical route at the common intersection do not match each other, determination may be made that the vehicle traveling along the practical route will not go straight ahead at the common intersection.

Another aspect of the present disclosure is an erroneous route conversion determination method for an erroneous route conversion determination apparatus that determines presence or absence of erroneous route conversion when a set route on a navigation map for a navigation system of a vehicle is converted into a practical route on a high-precision map. The erroneous route conversion determination method includes extracting position information of intersections on the set route and heading angles at the intersections on the set route based on the navigation map and the set route by the erroneous route conversion determination apparatus. The erroneous route conversion determination method includes extracting position information of intersections on the practical route and heading angles at the intersections on the practical route based on the high-precision map and the practical route by the erroneous route conversion determination apparatus. The erroneous route conversion determination method includes determining the presence or absence of the erroneous route conversion based on a heading angle of the set route at a common intersection that is an intersection common between the set route and the practical route and a heading angle of the practical route at the common intersection by the erroneous route conversion determination apparatus.

With the erroneous route conversion determination method according to another aspect of the present disclosure, the presence or absence of erroneous route conversion is determined from the heading angles of the set route and the practical route at the common intersection while focusing on the intersection where erroneous route conversion is likely to occur, so that the presence or absence of the erroneous route conversion in the conversion of the set route on the navigation map into the practical route on the high-precision map can be appropriately determined.

According to the aspects of the present disclosure, the presence or absence of erroneous route conversion when the set route on the navigation map is converted into the practical route on the high-precision map can be appropriately determined.

DETAILED DESCRIPTION

Hereinafter, embodiments of the present disclosure will be described with reference to the drawings.

First Embodiment

Figure 1:
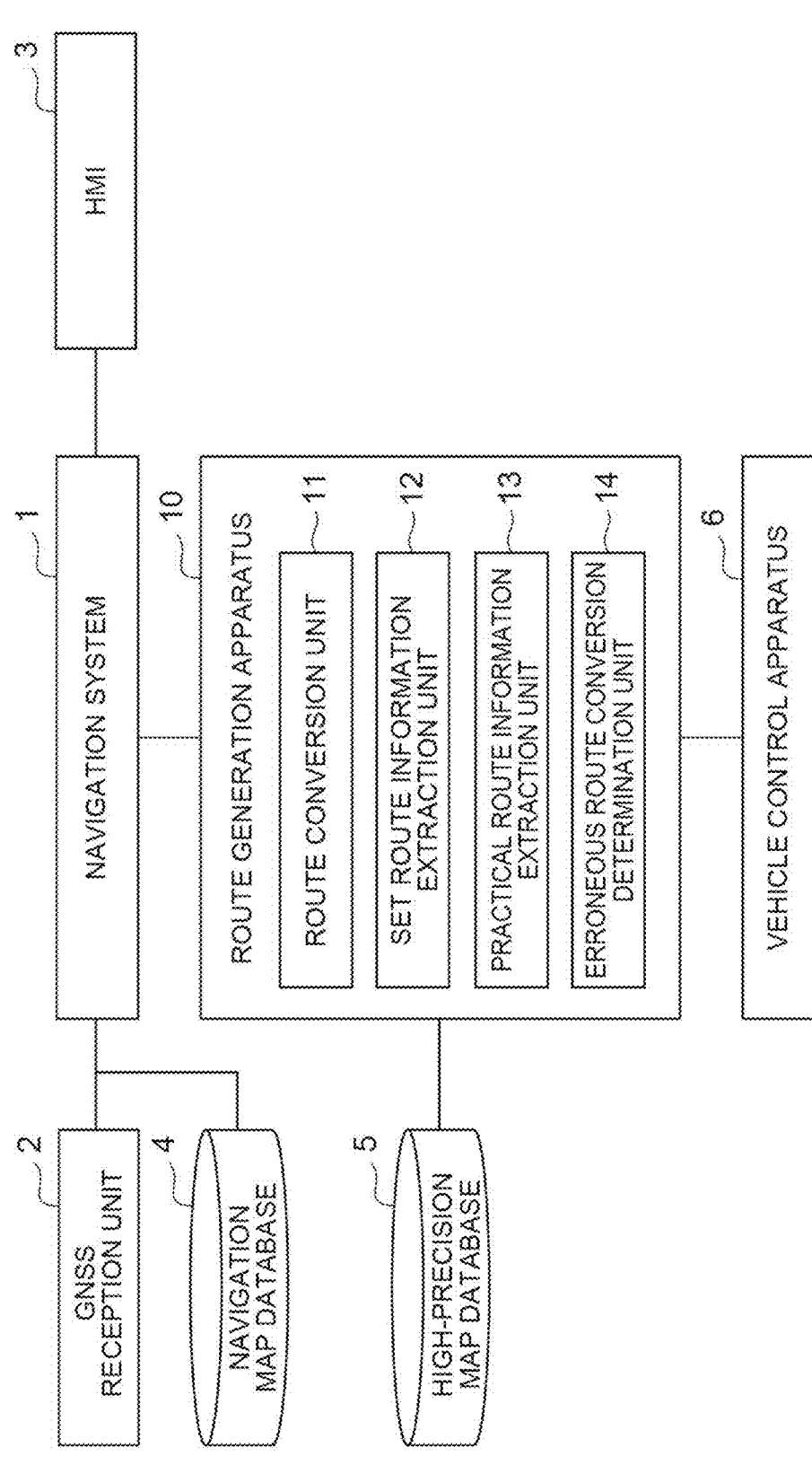
FIG. 1 is a block diagram illustrating a route generation apparatus (erroneous route conversion determination apparatus) according to a first embodiment.

FIG. 1 is a block diagram illustrating a route generation apparatus (erroneous route conversion determination apparatus) 10 according to a first embodiment. The route generation apparatus 10 illustrated in FIG. 1 is a apparatus that converts a set route on a navigation map generated by a navigation system 1 of a vehicle into a practical route on a high-precision map. To execute autonomous driving or driving assistance according to the set route on the navigation map, there is a need to convert the set route on the navigation map into the practical route on the high-precision map.

The navigation map is a map that is used by the navigation system 1 to guide a driver of the vehicle. The set route is a route for guidance until the vehicle reaches a destination on the navigation map. The high-precision map is a map with a precision higher than that of the navigation map and is map information with precision that can be used in autonomous driving or driving assistance. The practical route is a route on the high-precision map that can be used in autonomous driving or driving assistance of the vehicle. The practical route corresponds to a decoding result of conversion of the set route on the navigation map for the high-precision map.

In the conversion of the set route of the navigation map into the practical route of the high-precision map, erroneous conversion occurs due to conversion accuracy, a difference in freshness between the maps (for example, a time difference in map update frequency), a difference between specifications of map manufacturers, or the like. If erroneous conversion occurs, the vehicle may enter or may be guided to a wrong route by autonomous driving or driving assistance. For this reason, the route generation apparatus 10 determines whether or not erroneous route conversion occurs, by comparing the set route with the practical route. That is, the route generation apparatus 10 functions as an erroneous route conversion determination apparatus.

The route generation apparatus 10 according to the present embodiment is connected to the navigation system 1. The vehicle is not particularly limited as long as the vehicle travels on a road. The vehicle may be a four-wheeled vehicle or a two-wheeled vehicle or may be a personal mobility. The vehicle has a function of autonomous driving or driving assistance. Autonomous driving is vehicle control that causes the vehicle to autonomously travel toward a destination with no driving operation of the driver of the vehicle. Driving assistance is vehicle control that assists the driving of the driver of the vehicle. Driving assistance includes advanced driving assistance that assists the driving of the vehicle to travel along the practical route.

The navigation system 1 is a system that guides traveling of the vehicle to a preset destination for the driver. The destination is set by an occupant of the vehicle. A global navigation satellite system (GNSS) reception unit 2, a human-machine interface (HMI) 3, and a navigation map database 4 are connected to the navigation system 1.

The GNSS reception unit 2 measures a position of the vehicle (for example, latitude and longitude of the vehicle) by receiving signals from positioning satellites. The GNSS reception unit 2 may be a global positioning system (GPS) reception unit. The GNSS reception unit 2 transmits measured position information of the vehicle to the navigation system 1.

The HMI 3 is an interface that performs input/output of information between the navigation system 1 and the driver. The HMI 3 has, for example, a display, a speaker, an indicator, operation buttons, and the like provided inside a vehicle cabin. The HMI 3 may have a touch panel display or may have a head-up display (HUD). The HMI 3 transmits input information of the driver to the navigation system 1, thereby setting the destination of the vehicle by the driver. The HMI 3 displays guide information to the destination on the display inside the vehicle cabin according to a signal from the navigation system 1. The HMI 3 may perform guide by voice.

The navigation map database 4 is a database that stores the navigation map for use in guidance for the driver of the vehicle. The navigation map includes nodes, and road links that connect the nodes. The nodes correspond to intersections or junctions. The navigation map is road network data made of the nodes, the road links, and various kinds of information associated with the nodes and the road links. The navigation map corresponds to a standard (SD) map with a small amount of information compared to a high-precision map described below. The navigation map database 4 is not necessarily mounted on the vehicle. The navigation map database 4 may be formed on a server that can communicate with the vehicle.

The navigation system 1 recognizes a current position of the vehicle on the navigation map based on the position information of the vehicle measured by the GNSS reception unit 2 of the vehicle and the navigation map of the navigation map database 4. The navigation system 1 searches for the set route (guide route) until the vehicle reaches the destination, based on the current position of the vehicle, the destination, and the navigation map. A known method can be used for route search. The navigation system 1 guides a set route via the HMI 3 according to a request of the driver. The set route is not necessarily used for guiding the driver, and may be used only for route conversion described below.

Figure 2:
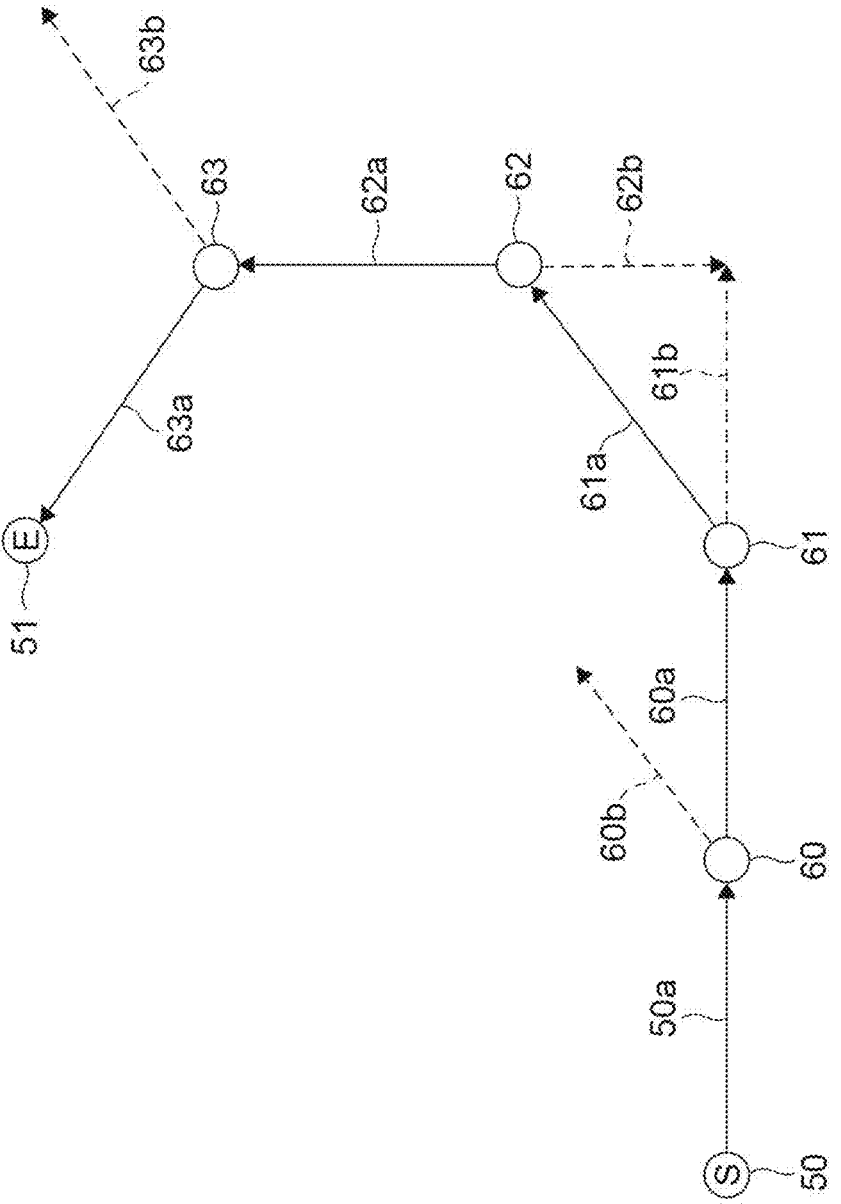
FIG. 2 is a diagram illustrating an example of a set route set on a navigation map.

Here, FIG. 2 is a diagram illustrating an example of a set route set on the navigation map. In FIG. 2, road links included in the set route are illustrated as solid lines, and road links not included in the set route are illustrated as broken lines. In FIG. 2, a departure point (a starting point of the set route) 50 and a destination 51 are illustrated. Also, in FIG. 2, a road link 50a extending from the departure point 50, a first node 60, two road links 60a and 60b extending from the first node 60, a second node 61, two road links 61a and 61b extending from the second node 61, a third node 62, two road links 62a and 62b extending from the third node 62, a fourth node 63, and two road links 63a and 63b extending from the fourth node 63 are illustrated.

In FIG. 2, the first node 60, the second node 61, the third node 62, and the fourth node 63 correspond to intersections or junctions on the set route. The road link 50a extending from the departure point 50 corresponds to an entry link from which the vehicle enters the first node 60 on the set route. The road link 60a is a road link on which the entered vehicle travels when going straight ahead at the first node

60. The road link 60b is a road link on which the entered vehicle travels when turning left in and diverging from the first node 60.

As illustrated in FIG. 2, the set route goes straight ahead at the first node 60 and passes through the road link 60a to head toward the second node 61. The road link 60a is an exit link to which the vehicle exits from the first node 60 on the set route, and is also an entry link from which the vehicle enters the second node 61.

At the second node 61, the road link 61a is a road link on which the entered vehicle travels when turning left at and diverging from the second node 61. The road link 61b is a road link on which the entered vehicle travels when going straight ahead at the second node 61. The set route turns left at the second node 61 and passes through the road link 61a to head toward the third node 62. The road link 61a is an exit link to which the vehicle exits from the second node 61 on the set route, and is also an entry link from which the vehicle enters the third node 62. The navigation system 1 guides the vehicle to move obliquely leftward (to the road link 61a) at the second node 61.

At the third node 62, the road link 62a is a road link on which the entered vehicle travels when turning left at and diverging from the third node 62. The road link 62b is a road link on which the entered vehicle travels when turning right in and diverging from the third node 62. The third node 62 is a T-shaped road, and the road link 62a and the road link 62b are disposed in a straight line. The set route turns left at the third node 62 and passes through the road link 62a to head toward the fourth node 63. The road link 62a is an exit link to which the vehicle exits from the third node 62 on the set route, and is also an entry link from which the vehicle enters the fourth node 63. The navigation system 1 guides the vehicle to move leftward (to the road link 62a) at the third node 62.

At the fourth node 63, the road link 63a is a road link on which the entered vehicle travels when turning left in and diverging from the fourth node 63. The road link 63b is a road link on which the entered vehicle travels when turning right in and diverging from the fourth node 63. The fourth node 63 is a Y-shaped road, and the road link 63a and the road link 63b are disposed in a Y shape. The set route turns left at the fourth node 63 and passes through the road link 63a to head toward the destination 51. The road link 63a is an exit link to which the vehicle exits from the fourth node 63 on the set route. The navigation system 1 guides the vehicle to move obliquely leftward (to the road link 63a) at the fourth node 63.

The route generation apparatus 10 converts the set route on the navigation map set by the navigation system 1 into the practical route on the high-precision map. The route generation apparatus 10 may be configured as a part of an autonomous driving system or a driving assistance system. The route generation apparatus 10 functions as an erroneous route conversion determination apparatus that determines whether or not erroneous route conversion occurs.

The route generation apparatus 10 includes an electronic control unit (ECU) (not illustrated). The ECU is an electronic control unit having a central processing unit (CPU) and a storage unit such as a read only memory (ROM) or a random-access memory (RAM). The route generation apparatus 10 executes various kinds of calculation processing as described by the ECU.

The route generation apparatus 10 is connected to a high-precision map database 5 and a vehicle control apparatus 6. The high-precision map database 5 is a database that stores the high-precision map.

The high-precision map is a high-definition (HD) map with precision that can be used in autonomous driving or driving assistance. The high-precision map has detailed information compared to the navigation map. In the high-precision map, road links may be distinguished for each lane, and not only intersections or junctions, but also points where a shape (for example, a lane width) of a road is changed may be registered as nodes. In the high-precision map, a plurality of nodes corresponding to an entry point and an exit point with respect to one intersection may be set. The high-precision map may be configured with a precision that autonomous driving of a level 3 or more specified by Society of Automotive Engineers (SAE) of America can be executed. The high-precision map database 5 is not necessarily mounted on the vehicle, and may be formed on a server that can communicate with the vehicle.

The vehicle control apparatus 6 is an apparatus that controls the traveling of the vehicle. The vehicle control apparatus 6 may be a part of the autonomous driving system or the driving assistance system of the vehicle. The vehicle control apparatus 6 executes vehicle control based on the practical route generated by the route generation apparatus 10. The vehicle control apparatus 6 may execute autonomous driving by causing the vehicle to autonomously travel to the destination along the practical route. The vehicle control apparatus 6 may execute advanced driving assistance of assisting diverging, merging, lane change, right and left turning, and the like along the practical route.

The vehicle control apparatus 6 controls, for example, a drive actuator, a brake actuator, and a steering actuator of the vehicle to control the traveling of the vehicle. The drive actuator controls a supply amount (throttle valve opening degree) of air to an engine according to a control signal from the vehicle control apparatus 6 and controls drive power of the vehicle. When the vehicle is a hybrid electric vehicle (HEV), in addition to the supply amount of air to the engine, a control signal from the vehicle control apparatus 6 is input to a motor as a power source and the drive power is controlled. When the vehicle is a battery electric vehicle (BEV), a control signal from the vehicle control apparatus 6 is input to a motor as a power source and the drive power is controlled. The brake actuator controls a brake system according to a control signal from the vehicle control apparatus 6 and controls braking force to be given to wheels of the vehicle. The steering actuator controls drive of an assist motor configured to control steering torque in an electric power steering system according to a control signal from the vehicle control apparatus 6.

Next, a functional configuration of the route generation apparatus will be described. The route generation apparatus 10 has a route conversion unit 11, a set route information extraction unit 12, a practical route information extraction unit 13, and an erroneous route conversion determination unit 14.

The route conversion unit 11 converts the set route on the navigation map of the vehicle into the practical route on the high-precision map. The route conversion unit 11 converts the set route into the practical route by a known route conversion method. As the route conversion method, for example, a dynamic location referencing (DLR) system and a pre-coded location referencing (Pre-Coded) system are known. In the DLR system, it is known that a match rate of a position on the navigation map and a position on the high-precision map is reduced according to a map difference. Also, in the Pre-Coded system, when a road structure is changed, such as when a link ID corresponding to a new road is allocated or when an intersection is reconstructed, erroneous conversion of a route may occur due to a time difference in update timing between the navigation map and the high-precision map, among other reasons. In this way, there is a possibility of erroneous route conversion in any system.

The set route information extraction unit 12 extracts set route information as information regarding the set route, based on the navigation map of the navigation map database 4 and the set route set by the navigation system 1. The set route information includes, for example, position information of intersections on the set route and a heading angle at an intersection of the set route. The set route information may include the number of road links of each intersection. In addition to the intersections, position information of junctions, a heading angle, and the like may be extracted.

The position information of an intersection on the set route may be the latitude and longitude on the navigation map. The position information of an intersection on the set route may be information of relative coordinates with a guide start point of the vehicle on the navigation map as a reference. The guide start point is, for example, the starting point of the set route. As the position information of an intersection on the set route, a traveling distance or a traveling ratio on the set route with a current vehicle position as a reference may be used. The traveling ratio is a ratio of a distance between the current vehicle position on the set route and the intersection to a total distance between the current vehicle position and a destination on the set route. In this case, a departure place of the set route may be used instead of the current vehicle position.

The heading angle at the intersection of the set route corresponds to an angle between an entry link and an exit link with respect to the intersection of the set route. The entry link is a road link on the navigation map corresponding to a road when the vehicle that travels along the set route enters the intersection. The exit link is a road link on the navigation map corresponding to a road when the vehicle that travels along the set route exits from the intersection.

Figure 3A:
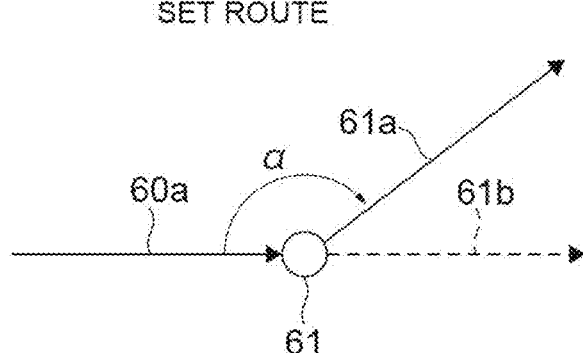
FIG. 3A is a diagram illustrating an example of a heading angle at an intersection of the set route.

Here, FIG. 3A is a diagram illustrating an example of the heading angle at the intersection on the set route. FIG. 3A illustrates a heading angle α of the set route at the second node 61 illustrated in FIG. 2. As illustrated in FIG. 3A, the heading angle α of the set route at the second node 61 can be obtained as an angle between the road link 60a that is an entry link on the set route with respect to the second node 61 and the road link 61a that is an exit link on the set route with respect to the second node 61.

A shape of data of the heading angle is not particularly limited. The heading angle may be represented as a heading direction (information only made of turning right, turning left, and going straight) of the vehicle at the intersection. The heading angle may be represented using any angle unit obtained by equally dividing a circumference by a predetermined value (for example, 16 divisions). The heading angle may be represented using an angle (so-called arc degree) of an arc obtained by equally dividing a circumference into 360 parts with respect to a center. Moreover, the set route information may include an angle between each road link connected to each intersection on the set route and the entry link.

The set route information may include road information of roads on the set route. The road information is included in the navigation map. The road information includes road types such as motorways or open roads. In the road type, a connection road from an open road to a motorway may be indicated distinctly, and an exit road from a motorway to an open road may be indicated distinctly. The road type may also include national roads and principal local roads, and may also include distinction of whether or not a road is a toll road.

The road information may include at least one of a road width, the number of lanes of a road, a road name, and a road number. The set route information extraction unit 12 extracts each of road information of an entry link and road information of an exit link at an intersection of the set route. Moreover, the set route information may include guide information by the navigation system 1. Furthermore, the set route information may include road information of each road link connected to each intersection on the set route.

The practical route information extraction unit 13 extracts practical route information as information regarding the practical route, based on the high-precision map of the high-precision map database 5 and the practical route generated by the route conversion unit 11. The practical route information includes, for example, position information of intersections on the practical route and a heading angle at an intersection of the practical route. When an intersection is made of a plurality of nodes, the practical route information extraction unit 13 performs extraction as an intersection separately from nodes. The practical route information may include the number of branches at an intersection. The number of branches is counted for each road, not for each lane, for comparison with the navigation map. To facilitate the description, expressions such as a node and a road link are also used on the high-precision map.

The position information of an intersection on the practical route is extracted in a format comparable with the position information of an intersection of the set route. For example, when position information of the center of the intersection is included in the high-precision map, position information of the center of the intersection is employed as the position information of the intersection on the practical route. When only position information of nodes set at an entry point and an exit point of the intersection are included in the high-precision map, intermediate coordinates of nodes corresponding to the intersection may be employed as the position information of the intersection. The position information of the intersection on the practical route may be latitude and longitude on the high-precision map or may be information of relative coordinates with a guide start point (for example, a starting point of the practical route) of the vehicle on the high-precision map as a reference. As the position information of the intersection on the practical route, a traveling distance or a traveling ratio on the practical route with a current vehicle position as a reference may be used. In this case, a departure place of the practical route may be used instead of the current vehicle position.

A heading angle at the intersection of the practical route is also extracted in a format comparable with the heading angle at the intersection of the set route. The heading angle at the intersection of the practical route may be more detailed information than the heading angle at the intersection of the set route.

The heading angle at the intersection of the practical route corresponds to an angle between the entry link and the exit link with respect to the intersection of the practical route. The entry link and the exit link at the practical route may be handled in units of lanes or may be handled in units of roads as a collection of a plurality of adjacent lanes.

Figure 3B:
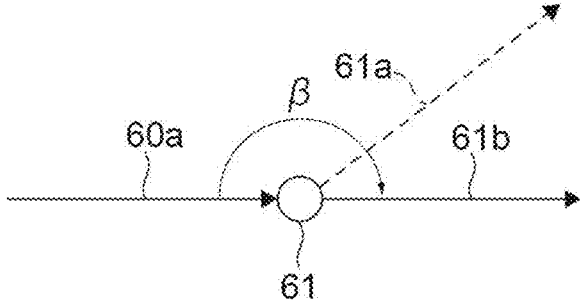
FIG. 3B is a diagram illustrating an example of a practical route where erroneous route conversion occurs.

FIG. 3B is a diagram illustrating an example of a practical route in which erroneous route conversion occurs. Here, to facilitate the description, the practical route on the high-precision map is represented using a node and road links equivalent to the navigation map. In FIG. 3B, it is assumed that the road link 61*b*, rather than the road link 61*a*, is recognized as an exit link on the practical route due to erroneous route conversion. In FIG. 3B, a road link included in the practical route is illustrated by a solid line, and a road link not included in the practical route is illustrated by a broken line.

The practical route information extraction unit 13 extracts a heading angle β (about 180°) between the entry link 60*a* and the exit link 61*b* as a heading angle at the second node 61 as illustrated in FIG. 3B. A format of data of the heading angle at the intersection of the practical route is not particularly limited as long as the heading angle can be compared with the heading angle at the intersection of the set route.

The practical route information may include road information of roads on the practical route. The road information is included in the high-precision map. The road information of the roads on the practical route is extracted in a format comparable with the road information of the roads of the set route. The road information may include at least one of a road width, the number of lanes of a road, a road name, and a road number. The road information of the practical route may be more detailed information than the road information of the set route. The practical route information extraction unit 13 distinctly extracts road information of an entry link and road information of an exit link at an intersection of the practical route.

The erroneous route conversion determination unit 14 determines the presence or absence of erroneous route conversion by the route conversion unit 11, based on the set route information extracted by the set route information extraction unit 12 and the practical route information extracted by the practical route information extraction unit 13. The erroneous route conversion determination unit 14 performs determination of erroneous route conversion using, for example, a common intersection that is an intersection common between the set route and the practical route.

The erroneous route conversion determination unit 14 specifies the common intersection based on the position information of the intersections of the set route and the position information of the intersections of the practical route. Typically, all intersections on the set route are common intersections that are common to the practical route. The erroneous route conversion determination unit 14 determines, as a common intersection, an intersection having matching position information such as latitude and longitude.

The erroneous route conversion determination unit 14 may require complete matching of the position information of the intersection or may not require complete matching of the position information of the intersection in specifying a common intersection. When there is an intersection on the practical route at a distance from a position of an intersection on the set route less than an intersection determination threshold, the erroneous route conversion determination unit 14 may specify the intersection as the common intersection. A value of the intersection determination threshold is not particularly limited, but can be set based on a difference in precision between the navigation map and the high-precision map, or the like.

The erroneous route conversion determination unit 14 may extract the intersection as the common intersection when the number of branches of the intersection matches in the set route and the practical route, in addition to the determination of the position information of the intersection. The number of branches is the number of roads that branch from the intersection. Besides, the erroneous route conversion determination unit 14 may use a common junction, instead of a common intersection, in the following processing. The erroneous route conversion determination unit 14 may use both the common intersection and the common junction.

The erroneous route conversion determination unit 14 determines the presence or absence of erroneous route conversion for each intersection, for example, using the heading angle or the road information at a common intersection. The erroneous route conversion determination unit 14 determines whether or not the vehicle traveling along the set route will go straight ahead at the common intersection, based on the heading angle of the set route at the common intersection. Going straight refers to a case where the vehicle continues to move on a road on which the vehicle is traveling, without turning right or turning left. Going straight also includes a case where the vehicle that travels in the middle of a curve or along a common junction branching in a Y shape moves along a road on which the vehicle is traveling.

Specifically, when a road link having an angle with respect to an entry link of the set route closest to 180° among a plurality of road links of the common intersection is not an exit link of the set route, the erroneous route conversion determination unit 14 determines that the vehicle traveling along the set route will not go straight ahead at the common intersection. In general, because a road link positioned in front of the entry link is highly likely to be a heading destination when the vehicle will go straight ahead at the intersection, when there is a road link positioned in front of the entry link compared to the exit link, it can be considered that the vehicle traveling along the set route turns right or turns left at the common intersection. The erroneous route conversion determination unit 14 may perform the above-described determination referring to the navigation map.

At the second node 61 illustrated in FIG. 3A, because the road link 61*b* having an angle with respect to the entry link 60*a* closest to 180° is different from the exit link 61*a* on the set route, the erroneous route conversion determination unit 14 determines that the vehicle traveling along the set route will not go straight ahead at the second node 61 (common intersection).

When a difference (absolute value) in angle between the heading angle of the set route at the common intersection and 180° is equal to or greater than a branching determination threshold, the erroneous route conversion determination unit 14 may determine that the vehicle traveling along the set route will not go straight ahead at the common intersection. When there is no road link positioned in front of the entry link and the road link branches in a Y shape, determination may be made that the vehicle traveling along the set route will not go straight ahead at the common intersection. A value of the branching determination threshold is not particularly limited. The branching determination threshold may be 30°, 45°, 50°, or 60°.

When the heading angle is extracted as information of a heading direction (turning right, turning left, going straight, or the like) of the vehicle at the intersection, the erroneous route conversion determination unit 14 can directly determine whether or not the vehicle will go straight ahead at the common intersection, from the heading angle of the set route at the common intersection.

The erroneous route conversion determination unit 14 may determine whether or not the vehicle traveling along the set route will go straight ahead at the common intersection, based on the road information of the set route before and after the common intersection. The erroneous route conversion determination unit 14 determines whether or not a road type of the entry link and a road type of the exit link of the set route with respect to the common intersection match each other. When the road type of the entry link and the road type of the exit link of the set route with respect to the common intersection do not match each other, the erroneous route conversion determination unit 14 determines that the vehicle traveling along the set route will not go straight ahead at the common intersection. In general, when the vehicle will go straight ahead at the intersection, it can be considered that the road type (for example, an open road) of the entry link and the road type (for example, an open road) of the exit link match each other.

The erroneous route conversion determination unit 14 may determine whether or not a road link matching the road type of the entry link among the road links of the common intersection is only the exit link. When the road link that matches the road type of the entry link among the road links of the common intersection is only the exit link, the erroneous route conversion determination unit 14 determines that the vehicle traveling along the set route will go straight ahead at the common intersection. This is because, in general, when the vehicle will go straight ahead at the intersection and travels on the same road, the road type of the entry link and the road type of the exit link match each other. The erroneous route conversion determination unit 14 may perform the above-described determination referring to the navigation map.

The erroneous route conversion determination unit 14 may determine whether or not the vehicle traveling along the set route will go straight ahead at the common intersection, using the road information such as a road number, a road name, or a road width similarly to the road type. It is assumed that the road number is set in units of roads, not in units of lanes.

In general, when the vehicle goes straight ahead at the intersection and travels on the same road, it can be considered that the road number of the entry link and the road number of the exit link match each other or a road number is given based on certain regularity like a serial number. The road name is also highly likely to be common before and after the intersection in a case of the same road. For this reason, when a road link matching the road number or the road name of the entry link among the road links of the common intersection is only the exit link, the erroneous route conversion determination unit 14 may determine that the vehicle traveling along the set route will go straight ahead at the common intersection. In regard to the determination of going straight, the road width can be also referred to.

Similarly, the erroneous route conversion determination unit 14 determines whether or not the vehicle traveling along the practical route will go straight ahead at the common intersection, based on a heading angle of the practical route at the common intersection. A determination method of a heading direction of the common intersection using the heading angle can be similar to the method for the set route.

Because the road link 61*b* having the angle with respect to the entry link 60*a* closest to 180° at the second node 61 illustrated in FIG. 3B matches an exit link 61*b* on the practical route, the erroneous route conversion determination unit 14 determines that the vehicle traveling along the practical route will go straight ahead at the second node 61 (common intersection). The erroneous route conversion determination unit 14 may perform the above-described determination referring to the high-precision map.

The erroneous route conversion determination unit 14 may determine whether or not the vehicle traveling along the practical route will go straight ahead at the common intersection, based on the road information of the practical route before and after the common intersection. A determination method of a heading direction at the common intersection using the road information can be similar to the method for the set route. The erroneous route conversion determination unit 14 may perform the above-described determination referring to the high-precision map.

The erroneous route conversion determination unit 14 determines the presence or absence of erroneous route conversion based on a determination result of the heading direction of the set route at the common intersection and a determination result of the heading direction of the practical route at the common intersection. When the determination result of the heading direction of the set route at the common intersection and the determination result of the heading direction of the practical route at the common intersection do not match each other, the erroneous route conversion determination unit 14 determines that erroneous route conversion occurs at the common intersection.

Specifically, when determination is made that the heading direction of the set route at the second node 61 is not going straight as illustrated in FIG. 3A, while determination is made that the heading direction of the practical route at the second node 61 is going straight as illustrated in FIG. 3B, the erroneous route conversion determination unit 14 determines that erroneous route conversion occurs at the second node 61.

In the determination of the heading direction at the common intersection, the erroneous route conversion determination unit 14 may determine any of going straight, turning right, and turning left, instead of whether or not the vehicle goes straight. Turning right or turning left can be determined from a magnitude relationship between the heading angle of the exit link with respect to the entry link and 180°. In this case, when determination is made that the heading direction of the set route at the common intersection is turning left, and determination is made that the heading direction of the practical route at the common intersection is turning right, the erroneous route conversion determination unit 14 determines that erroneous route conversion occurs at the common intersection.

When determination is made that erroneous route conversion does not occur at all common intersections to be a determination target, the erroneous route conversion determination unit 14 may determine that erroneous route conversion does not occur for the entire practical route. The erroneous route conversion determination unit 14 may narrow down the common intersections as a determination target. The erroneous route conversion determination unit 14 may determine whether or not the heading direction of the set route and the heading direction of the practical route match each other, with only the common intersections at which the heading direction of the set route is turning left or turning right, as a determination target, for example.

Figure 4:
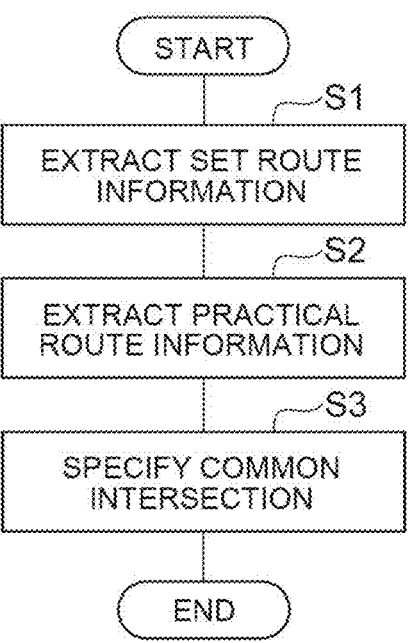
FIG. 4 is a flowchart illustrating an example of common intersection specification processing.

Next, an erroneous route conversion determination method of the route generation apparatus 10 (erroneous route conversion determination apparatus) according to the first embodiment will be described with reference to FIGS. 4 to 7. FIG. 4 is a flowchart illustrating an example of common intersection specification processing. This processing is executed when conversion of the set route into the practical route is performed.

As illustrated in FIG. 4, as S1, the route generation apparatus 10 performs the extraction of the set route information by the set route information extraction unit 12. The set route information extraction unit 12 extracts the set route information based on the navigation map of the navigation map database 4 and the set route set by the navigation system 1. Thereafter, the route generation apparatus 10 proceeds to S2.

In S2, the route generation apparatus 10 performs the extraction of the practical route information by the practical route information extraction unit 13. The practical route information extraction unit 13 extracts the practical route information based on the high-precision map of the high-precision map database 5 and the practical route generated by the route conversion unit 11. The order of S1 and S2 may be reversed or S1 and S2 may be executed at the same time. Thereafter, the route generation apparatus 10 proceeds to S3.

In S3, the route generation apparatus 10 specifies the common intersection by the erroneous route conversion determination unit 14. The erroneous route conversion determination unit 14 specifies the common intersection based on the position information of the intersections of the set route and the position information of the intersection of the practical route. The common intersection may include common junctions. Thereafter, the route generation apparatus ends the common intersection specification processing.

Figure 5:
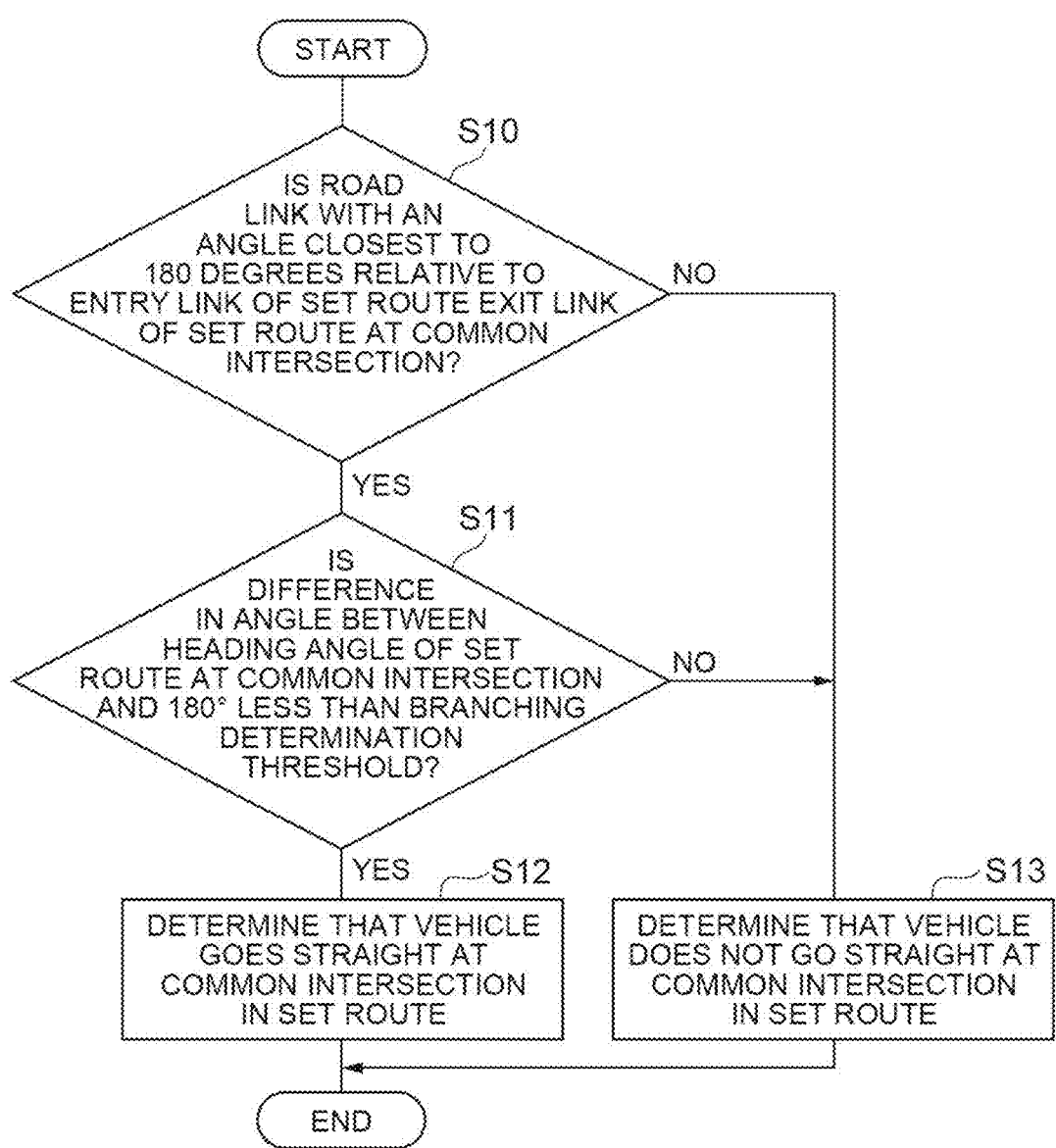
FIG. 5 is a flowchart illustrating an example of heading direction determination processing of the set route.

FIG. 5 is a flowchart illustrating an example of heading direction determination processing of the set route. The heading direction determination processing is executed when the common intersection is specified in the flowchart illustrated in FIG. 4.

As illustrated in FIG. 5, in S10, the route generation apparatus 10 determines whether or not the road link having the angle with respect to the entry link of the set route closest to 180° among a plurality of road links of the common intersection is the exit link of the set route, by the erroneous route conversion determination unit 14. When determination is made that the road link closest to 180° is the exit link of the set route (S10: YES), the route generation apparatus 10 proceeds to S11. When determination is not made that the road link closest to 180° is the exit link of the set route (S10: NO), the route generation apparatus 10 proceeds to S13.

In S11, the route generation apparatus 10 determines whether or not the difference in angle between the heading angle of the set route at the common intersection and 180° is equal to or greater than the branching determination threshold, by the erroneous route conversion determination unit 14. When determination is made that the difference in angle is equal to or greater than the branching determination threshold (S11: YES), the route generation apparatus 10 proceeds to S12. When determination is not made that the difference in angle is equal to or greater than the branching determination threshold (S11: NO), the route generation apparatus 10 proceeds to S13.

In S12, the route generation apparatus 10 determines that the vehicle will go straight ahead at the common intersection in the set route. Thereafter, the present heading direction determination processing ends.

In S13, the route generation apparatus 10 determines that the vehicle will not go straight ahead at the common intersection in the set route. Thereafter, the present heading direction determination processing ends.

Figure 6:
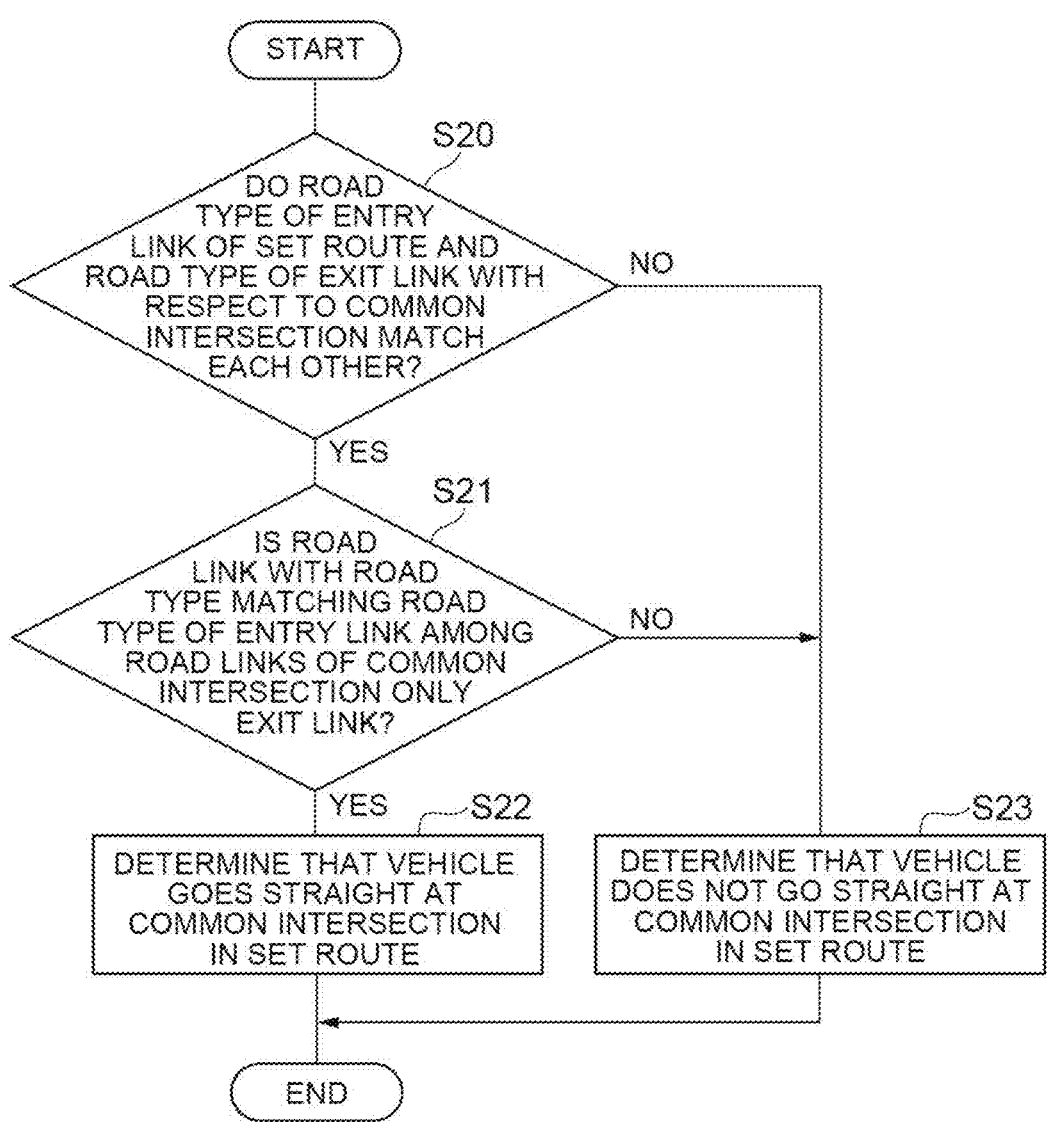
FIG. 6 is a flowchart illustrating another example of heading direction determination processing of the set route.

FIG. 6 is a flowchart illustrating another example of heading direction determination processing of the set route. The heading direction determination processing of FIG. 6 may be executed instead of the heading direction determination processing of FIG. 5 or both the processing of FIGS. 5 and 6 may be executed. When both the processing of FIGS. 5 and 6 are executed, a determination result of FIG. 6 may be given priority.

As illustrated in FIG. 6, in S20, the route generation apparatus 10 determines whether or not the road type of the entry link and the road type of the exit link of the set route with respect to the common intersection match each other, by the erroneous route conversion determination unit 14. When determination is made that the road type of the entry link and the road type of the exit link match each other (S20: YES), the route generation apparatus 10 proceeds to S21. When determination is not made that the road type of the entry link and the road type of the exit link match each other (S20: NO), the route generation apparatus 10 proceeds to S23.

In S21, the route generation apparatus 10 determines whether or not the road link matching the road type of the entry link among the road links of the common intersection is only the exit link, by the erroneous route conversion determination unit 14. When determination is made that the road link matching the road type of the entry link is only the exit link (S21: YES), the route generation apparatus 10 proceeds to S22. When determination is not made that the road link matching the road type of the entry link is only the exit link (S21: NO), the route generation apparatus 10 proceeds to S23.

In S22, the route generation apparatus 10 determines that the vehicle will go straight ahead at the common intersection in the set route. Thereafter, the present heading direction determination processing ends.

In S23, the route generation apparatus 10 determines that the vehicle will not go straight ahead at the common intersection in the set route. Thereafter, the present heading direction determination processing ends.

The flowcharts of FIGS. 5 and 6 can also be applied to the practical route, not the set route. The heading direction of the practical route at the common intersection can be determined by the procedure of the heading direction determination processing illustrated in FIGS. 5 and 6.

Figure 7:
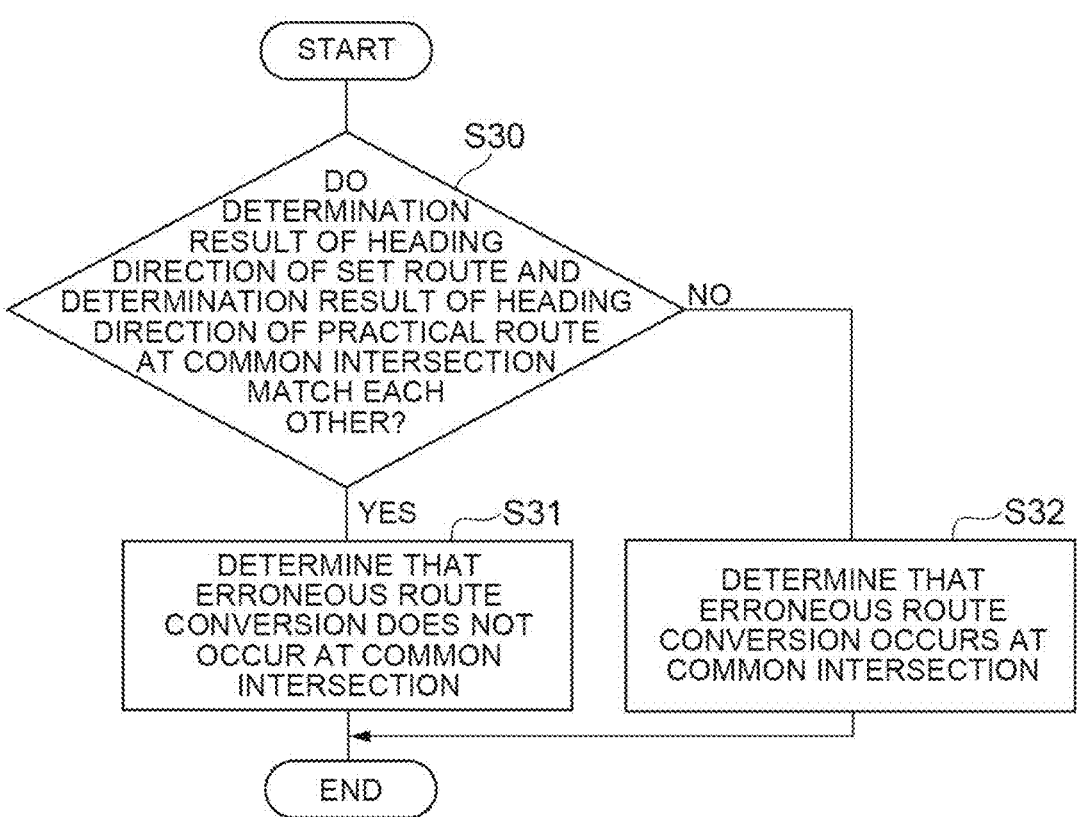
FIG. 7 is a flowchart illustrating an example of erroneous route conversion determination processing.

FIG. 7 is a flowchart illustrating an example of erroneous route conversion determination processing. The erroneous route conversion determination processing illustrated in FIG. 7 is executed when the determination result of the heading direction of the set route and the determination result of the heading direction of the practical route at the common intersection are obtained by the heading direction determination processing as illustrated in FIG. 5 or 6. The erroneous route conversion determination processing is executed for each common intersection.

As illustrated in FIG. 7, as S30, the route generation apparatus 10 determines whether or not the determination result of the heading direction of the set route and the determination result of the heading direction of the practical route at the common intersection match each other, by the erroneous route conversion determination unit 14. When determination is made that the determination result of the heading direction of the set route and the determination result of the heading direction of the practical route match each other (S30: YES), the route generation apparatus 10 proceeds to S31. When determination is not made that the determination result of the heading direction of the set route and the determination result of the heading direction of the practical route match each other (S30: NO), the route generation apparatus 10 proceeds to S32.

In S31, the route generation apparatus 10 determines that erroneous route conversion does not occur at the common intersection. Thereafter, the present erroneous route conversion determination processing ends.

In S32, the route generation apparatus 10 determines that erroneous route conversion occurs at the common intersection. Thereafter, the present erroneous route conversion determination processing ends.

When determination is made that erroneous route conversion occurs at even one of the common intersections, the route generation apparatus 10 determines that erroneous route conversion occurs on the present conversion of the set route into the practical route. When determination is made that erroneous route conversion occurs, the route generation apparatus 10 discards the practical route where erroneous route conversion occurs. The route generation apparatus 10 may perform conversion of the set route into the practical route again or may notify the driver of the occurrence of abnormality.

When determination is made that erroneous route conversion does not occur at all common intersections, the route generation apparatus 10 determines that erroneous route conversion does not occur on the present conversion of the set route into the practical route. The route generation apparatus 10 transmits, to the vehicle control apparatus 6, information of the practical route where erroneous route conversion does not occur.

With the route generation apparatus 10 according to the first embodiment described above, the presence or absence of erroneous route conversion is determined from the heading angles of the set route and the practical route at the common intersection or the road information before and after the common intersection while focusing on the intersection (or the junction) where erroneous route conversion is likely to occur, so that the presence or absence of erroneous route conversion in converting of the set route on the navigation map into the practical route on the high-precision map can be appropriately determined. The junction may be used in addition to the intersection.

Specifically, in the route generation apparatus 10, from the fact that the road link positioned in front of the entry link at the common intersection is highly likely to be the heading destination when the vehicle goes straight ahead at the common intersection, when the road link having the angle with respect to the entry link of the set route closest to 180° is not the exit link of the set route, determination can be appropriately made that the vehicle traveling along the set route will not go straight ahead at the common intersection. In the route generation apparatus 10, because it is considered that the road type such as an open road or a motorway matches between the entry link and the exit link when the vehicle goes straight ahead at the common intersection, determination can be appropriately made that the set route will not go straight ahead at the common intersection, by determining matching of the road type of the entry link and the road type of the exit link of the common intersection in the set route. The same also applies to the determination of the heading direction of the practical route at the common intersection.

In this way, in the route generation apparatus 10, because the heading direction of the set route at the common intersection and the heading direction of the practical route at the common intersection can be appropriately determined, the presence of absence of erroneous route conversion of the common intersection can be determined using the determination results with high accuracy.

Second Embodiment

Figure 8:
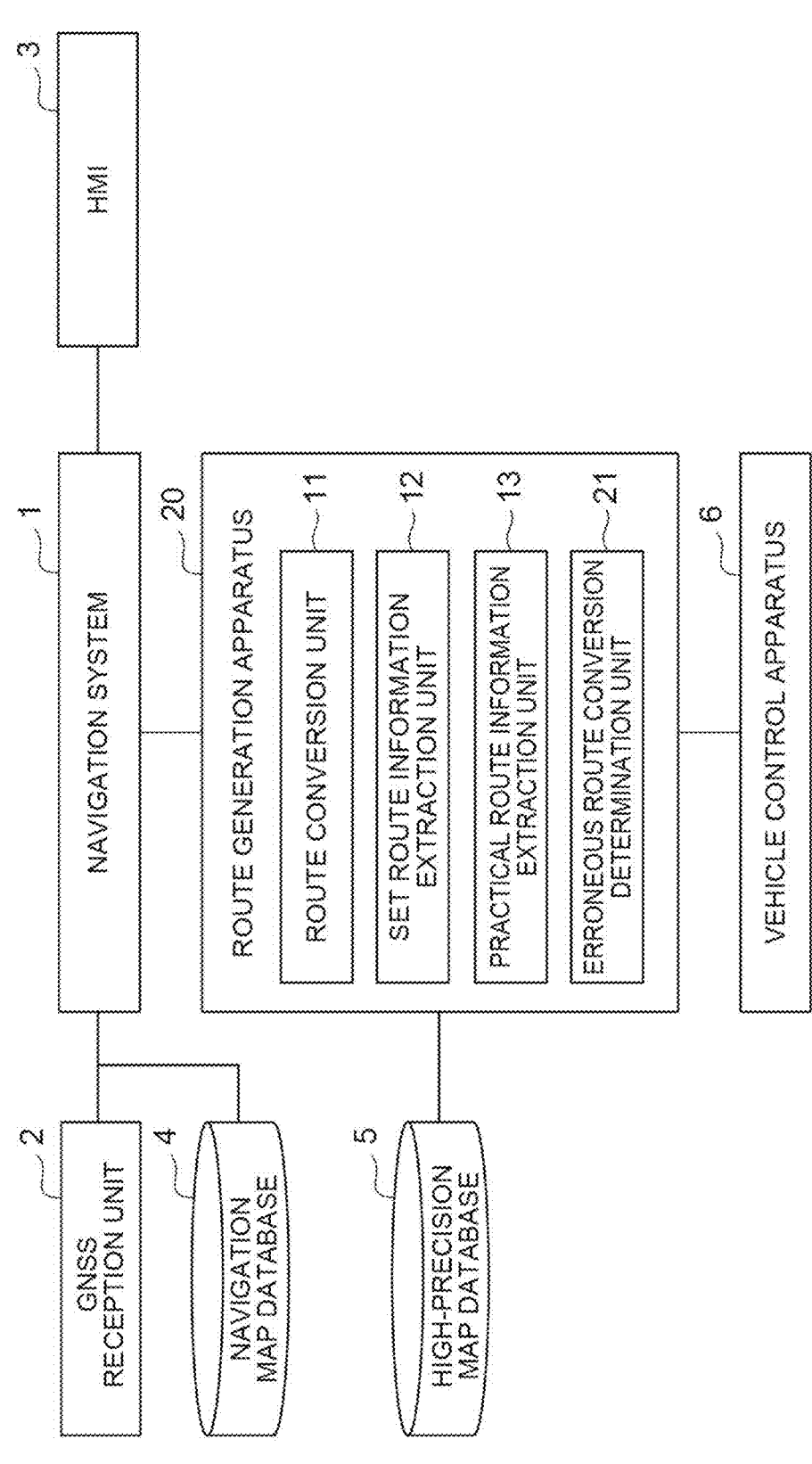
FIG. 8 is a block diagram illustrating a route generation apparatus (erroneous route conversion determination apparatus) according to a second embodiment.

Subsequently, a route generation apparatus according to a second embodiment will be described. FIG. 8 is a block diagram illustrating a route generation apparatus (erroneous route conversion determination apparatus) according to the second embodiment. A route generation apparatus 20 illustrated in FIG. 8 is different from the first embodiment only in a function of an erroneous route conversion determination unit 21.

Unlike the first embodiment, the erroneous route conversion determination unit 21 according to the second embodiment determines the presence or absence of erroneous route conversion, instead of determining the heading direction at the common intersection. For example, when a difference (absolute value) between the heading angle of the set route and the heading angle of the practical route at the common intersection is equal to or greater than an allowable angle threshold, the erroneous route conversion determination unit 21 determines that erroneous route conversion occurs. A value of the allowable angle threshold is not particularly limited. The allowable angle threshold may be 5°, 10°, 20°, 30°, or 45°.

For example, if the allowable angle threshold is set to 30°, and when the heading angle of the set route at the common intersection is 180° and the heading angle of the practical route at the same common intersection is 140°, because the difference is equal to or greater than the allowable angle threshold, the erroneous route conversion determination unit 21 determines that erroneous route conversion occurs.

The allowable angle threshold may be changed according to the number of road links connected to the intersection. As the number of road links connected to the intersection is smaller, the allowable angle threshold may have a greater value. It can be considered that, as the number of road links connected to the intersection is smaller, erroneous determination is difficult to occur. The allowable angle threshold may be changed according to the road types before and after the common intersection. For a common intersection between motorways, the erroneous route conversion determination unit 21 may set the allowable angle threshold to a greater value than a common intersection between open roads. It can be considered that a motorway has a road width greater than an open road and has a large difference angle between roads branching from an intersection or the like.

When the difference (absolute value) between the heading angle of the set route and the heading angle of the practical route at all common intersections is less than the allowable angle threshold, the erroneous route conversion determination unit 21 may determine that erroneous route conversion does not occur on the conversion of the set route into the practical route. The erroneous route conversion determination unit 21 may narrow down the common intersections as a determination target. The erroneous route conversion determination unit 21 may have, as a determination target, only the common intersection at which the heading direction of the set route is turning left or turning right.

The erroneous route conversion determination unit 21 may determine the presence or absence of erroneous route conversion based on the road information of the set route and the road information of the practical route. For example, when the road types of the set route before and after the common intersection and the road types of the practical route before and after the common intersection do not match each other, the erroneous route conversion determination unit 21 determines that erroneous route conversion occurs. When the road type of the entry link of the common intersection in the set route is an open road, and the road type of the exit link of the common intersection in the set route is a connection road to a motorway, and when the road type of the entry link of the common intersection in the practical route is an open road, and the road type of the exit link of the common intersection in the practical route is an open road, because the road types before and after the common intersection do not match each other, the erroneous route conversion determination unit 21 determines that erroneous route conversion occurs.

When the road types of the set route and the road types of the practical route before and after all common intersections match each other, the erroneous route conversion determination unit 21 may determine that erroneous route conversion does not occur on the conversion of the set route into the practical route.

Besides, when the road numbers of the set route before and after the common intersection and the road numbers of the practical route before and after the common intersection do not match each other, the erroneous route conversion determination unit 21 may determine that erroneous route conversion occurs. When a combination of the road widths of the set route before and after the common intersection and a combination of the road widths of the practical route before and after the common intersection do not match each other, the erroneous route conversion determination unit 21 may determine that erroneous route conversion occurs. The erroneous route conversion determination unit 21 may require complete matching of the road widths or may not require complete matching of the road widths. When a difference (absolute value) between the road width of the set route and the road width of the practical route is less than an allowable width threshold, the erroneous route conversion determination unit 21 may determine that the road widths match each other. The allowable width threshold is not particularly limited, but may be 30 cm or 50 cm.

The erroneous route conversion determination unit 21 may determine erroneous route conversion from a difference in road information regardless of the common intersection. For example, when the road types of roads on the set route and the road types of roads on the practical route do not entirely match each other, the erroneous route conversion determination unit 21 may determine that erroneous route conversion occurs. A case where the road types of roads on the set route and the road types of the roads on the practical route do not entirely match each other refers to, for example, a case where a road of which the road type is a motorway is included in the practical route even though the road types of all roads on the set route are open roads (for example, national roads).

When the road numbers of all roads on the set route and the road numbers of all roads on the practical route do not match each other (when even one road number is out of match), the erroneous route conversion determination unit 21 may determine that erroneous route conversion occurs. It is assumed that the road numbers are the same between the navigation map and the high-precision map. When the road names of the roads on the set route and the road names of the roads on the practical route do not entirely match each other, the erroneous route conversion determination unit 21 may determine that erroneous route conversion occurs.

When determination is not made that erroneous route conversion occurs even though erroneous route conversion determination set in advance among the above-described erroneous route conversion determination are entirely performed, the erroneous route conversion determination unit 21 determines that erroneous route conversion does not occur. Besides, when an intersection that is not a common intersection is included in the set route or the practical route, the erroneous route conversion determination unit 21 may determine that erroneous route conversion occurs.

Figure 9:
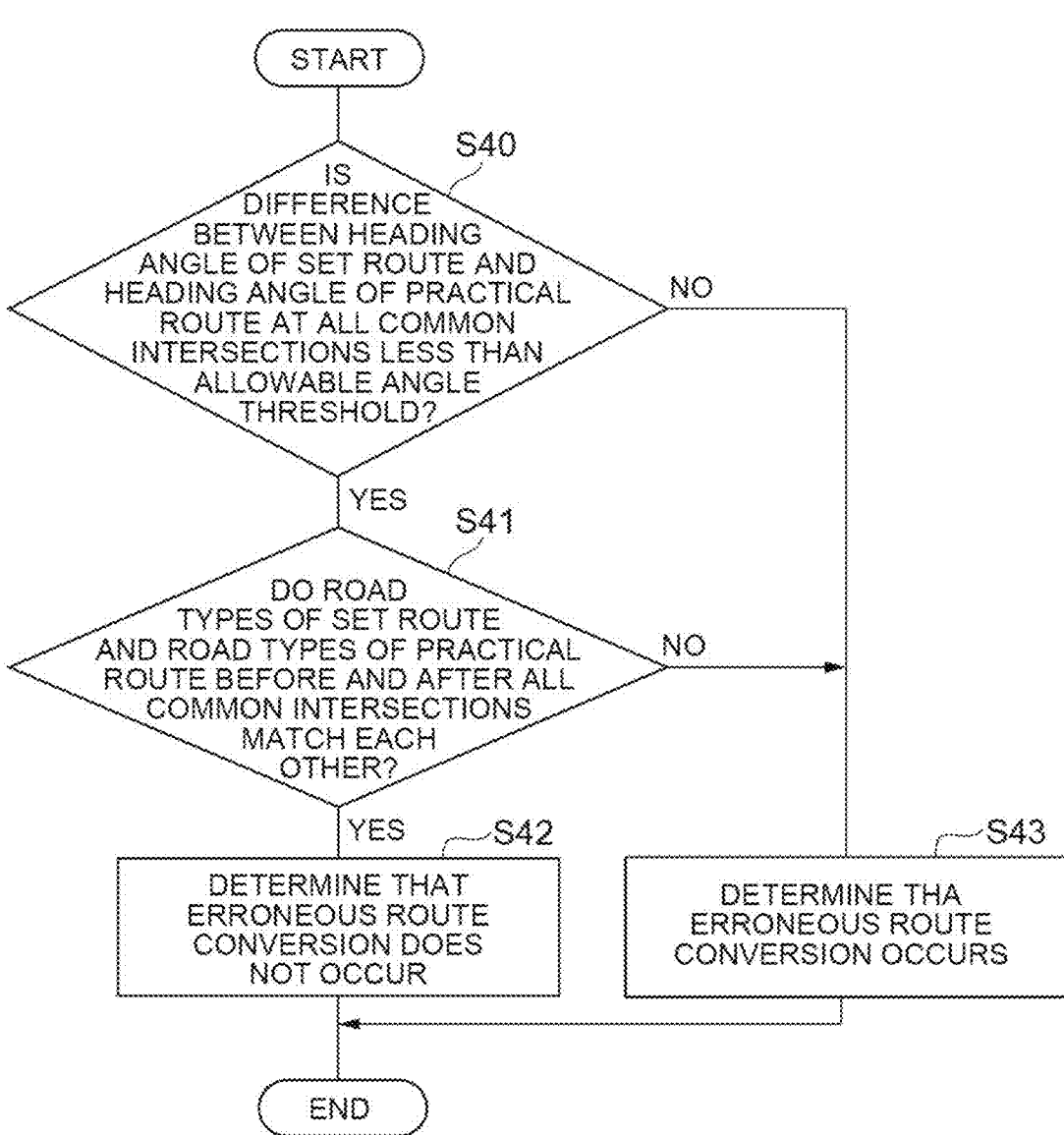
FIG. 9 is a flowchart illustrating another example of erroneous route conversion determination processing according to the second embodiment.

Next, an erroneous route conversion determination method of the route generation apparatus 20 according to the second embodiment will be described with reference to FIG. 9. FIG. 9 is a flowchart illustrating an example of erroneous route conversion determination processing according to the second embodiment.

As illustrated in FIG. 9, as S40, the route generation apparatus 20 determines whether or not the difference between the heading angle of the set route and the heading angle of the practical route at all common intersections is less than the allowable angle threshold, by the erroneous route conversion determination unit 21. When determination is made that the difference between the heading angle of the set route and the heading angle of the practical route at all common intersections is less than the allowable angle threshold (S40: YES), the route generation apparatus 20 proceeds to S41. When determination is not made that the difference between the heading angle of the set route and the heading angle of the practical route at all common intersections is less than the allowable angle threshold (S40: NO), the route generation apparatus 20 proceeds to S43. A case where the determination in S40 is made to be NO refers to a case where the difference between the heading angle of the set route and the heading angle of the practical route is equal to or greater than the allowable angle threshold at one or more common intersections.

In S41, the route generation apparatus 20 determines whether or not the road types of the set route and the road types of the practical route before and after all common intersections match each other, by the erroneous route conversion determination unit 21. When determination is made that the road types of the set route and the road types of the practical route before and after all common intersections match each other (S41: YES), the route generation apparatus 20 proceeds to S42. When determination is not made that the road types of the set route and the road types of the practical route before and after all common intersections match each other (S41: NO), the route generation apparatus proceeds to S43.

In S42, the route generation apparatus 20 determines that erroneous route conversion does not occur on the present conversion of the set route into the practical route. Thereafter, the present erroneous route conversion determination processing ends.

In S43, the route generation apparatus 20 determines that erroneous route conversion occurs on the present conversion of the set route into the practical route. Thereafter, the present erroneous route conversion determination processing ends.

Also in the route generation apparatus 20 according to the second embodiment described above, the presence or absence of erroneous route conversion is determined from the heading angles of the set route and the practical route at the common intersection or the road information before and after the common intersection while focusing on the intersection where erroneous route conversion is likely to occur, so that the presence of absence of erroneous route conversion in the conversion of the set route on the navigation map into the practical route on the high-precision map can be appropriately determined. A junction may be used in addition to the intersection.

Although the embodiments of the present disclosure have been described above, the present disclosure is not limited to the above-described embodiments. and the present disclosure can be implemented in various forms including various alterations and improvements based on the knowledge of those skilled in the art, including the above-described embodiments.

The erroneous route conversion determination apparatus according to the present disclosure is not necessarily integrated with the route generation apparatus 10 or 20 (that is, the erroneous route conversion determination unit 14 or 21). The erroneous route conversion determination apparatus may be an independent apparatus from a apparatus having the route conversion unit 11 or may configure a part of an autonomous driving system or a driving assistance system.

What is claimed is:

1. An erroneous route conversion determination apparatus comprising a vehicle control apparatus, a processor and a memory, the erroneous route conversion determination apparatus configured to determine presence or absence of erroneous route conversion when a set route on a navigation map generated by a navigation system of a vehicle is converted into a practical route on a high-precision map, wherein the vehicle control apparatus autonomously controls the vehicle to travel along the practical route, wherein the processor:

extracts position information of intersections on the set route and heading angles at the intersections on the set route based on the navigation map and the set route, extracts position information of intersections on the practical route and heading angles at the intersections on the practical route based on the high-precision map and the practical route, determines whether or not the vehicle traveling along the set route will go straight ahead at a common intersection that is an intersection common between the set route and the practical route, based on a heading angle of the set route at the common intersection, determines whether or not the vehicle traveling along the practical route will go straight ahead at the common intersection, based on a heading angle of the practical route at the common intersection, based on a determination result of a heading direction at the common intersection of the set route and a determination result of a heading direction at the common intersection of the practical route do not match each other, determines that the erroneous route conversion occurs, and based on determining that the erroneous route conversion occurs, discards the practical route where the erroneous route conversion occurs and reconverts the set route generated by the navigation system into a reconverted practical route on the high-precision map, and wherein, based on the processor reconverting the set route into the reconverted practical route, the vehicle control apparatus autonomously controls the vehicle to travel along the reconverted practical route.

2. The erroneous route conversion determination apparatus according to claim 1, wherein, when a road link having an angle with respect to an entry link of the set route closest to 180° among a plurality of road links extending from the common intersection is not an exit link of the set route, the processor determines that the vehicle traveling along the set route will not go straight ahead at the common intersection, and when a road link having an angle with respect to an entry link of the practical route closest to 180° among the plurality of road links extending from the common intersection is not an exit link of the practical route, the processor determines that the vehicle traveling along the practical route will not go straight ahead at the common intersection.

3. The erroneous route conversion determination apparatus according to claim 1, wherein the processor extracts road types of roads on the set route based on the navigation map and the set route, and extracts road types of roads on the practical route based on the high-precision map and the practical route, and wherein the processor determines the presence or absence of the erroneous route conversion based on the road types of the roads on the set route and the road types of the roads on the practical route.

4. The erroneous route conversion determination apparatus according to claim 1, wherein the processor extracts road types of roads on the set route based on the navigation map and the set route, and extracts road types of roads on the practical route based on the high-precision map and the practical route, and wherein the processor determines the presence or absence of the erroneous route conversion based on the road types of the roads on the set route and the road types of the roads on the practical route.

5. The erroneous route conversion determination apparatus according to claim 4, wherein the processor determines whether or not the vehicle traveling along the set route will go straight ahead at the common intersection, based on road types of the set route before and after the common intersection, and determines whether or not the vehicle traveling along the practical route will go straight ahead at the common intersection, based on road types of the practical route before and after the common intersection, and when a determination result of a heading direction at the common intersection of the set route and a determination result of a heading direction at the common intersection of the practical route do not match each other, the processor determines that the erroneous route conversion occurs.

6. The erroneous route conversion determination apparatus according to claim 4, wherein the processor determines whether or not the vehicle traveling along the set route will go straight ahead at the common intersection, based on road types of the set route before and after the common intersection, and is determines whether or not the vehicle traveling along the practical route will go straight ahead at the common intersection, based on road types of the practical route before and after the common intersection, and when a determination result of a heading direction at the common intersection of the set route and a determination result of a heading direction at the common intersection of the practical route do not match each other, the processor determines that the erroneous route conversion occurs.

7. The erroneous route conversion determination apparatus according to claim 5, wherein, when a road type of an entry link of the set route and a road type of an exit link of the set route at the common intersection do not match each other, the processor determines that the vehicle traveling along the set route will not go straight ahead at the common intersection, and when a road type of an entry link of the practical route and a road type of an exit link of the practical route at the common intersection do not match each other, the processor determines that the vehicle traveling along the practical route will not go straight ahead at the common intersection.

8. The erroneous route conversion determination apparatus according to claim 6, wherein, when a road type of an entry link of the set route and a road type of an exit link of the set route at the common intersection do not match each other, the processor determines that the vehicle traveling along the set route will not go straight ahead at the common intersection, and when a road type of an entry link of the practical route and a road type of an exit link of the practical route at the common intersection do not match each other, the processor determines that the vehicle traveling along the practical route will not go straight ahead at the common intersection.

9. An erroneous route conversion determination method for an erroneous route conversion determination apparatus that determines presence or absence of erroneous route conversion when a set route on a navigation map for a navigation system of a vehicle is converted into a practical route on a high-precision map, the erroneous route conversion determination apparatus comprising a vehicle control apparatus, a processor and a memory, the erroneous route conversion determination method comprising:

autonomously controlling, by the vehicle control apparatus, the vehicle to travel along the practical route extracting, by the processor, position information of intersections on the set route and heading angles at the intersections on the set route based on the navigation map and the set route by the erroneous route conversion determination apparatus;

extracting, by the processor, position information of intersections on the practical route and heading angles at the intersections on the practical route based on the high-precision map and the practical route by the erroneous route conversion determination apparatus;

determining, by the processor, whether or not the vehicle traveling along the set route will go straight ahead at a common intersection that is an intersection common between the set route and the practical route, based on a heading angle of the set route at the common intersection;

determining, by the processor, whether or not the vehicle traveling along the practical route will go straight ahead at the common intersection, based on a heading angle of the practical route at the common intersection;

based on a determination result of a heading direction at the common intersection of the set route and a determination result of a heading direction at the common intersection of the practical route do not match each other, determining, by the processor, that the erroneous route conversion occurs;

based on determining that the erroneous route conversion occurs, discarding, by the processor, the practical route where the erroneous route conversion occurs and reconverting, by the processor, the set route generated by the navigation system into a reconverted practical route on the high-precision map; and based on the processor reconverting the set route into the reconverted practical route, autonomously controlling, by the vehicle control apparatus, the vehicle to travel along the reconverted practical route.

* * * * *